(No Model.) 2 Sheets—Sheet 1.
W. L. FIELD.
TRANSPLANTER.
No. 554,669. Patented Feb. 18, 1896.
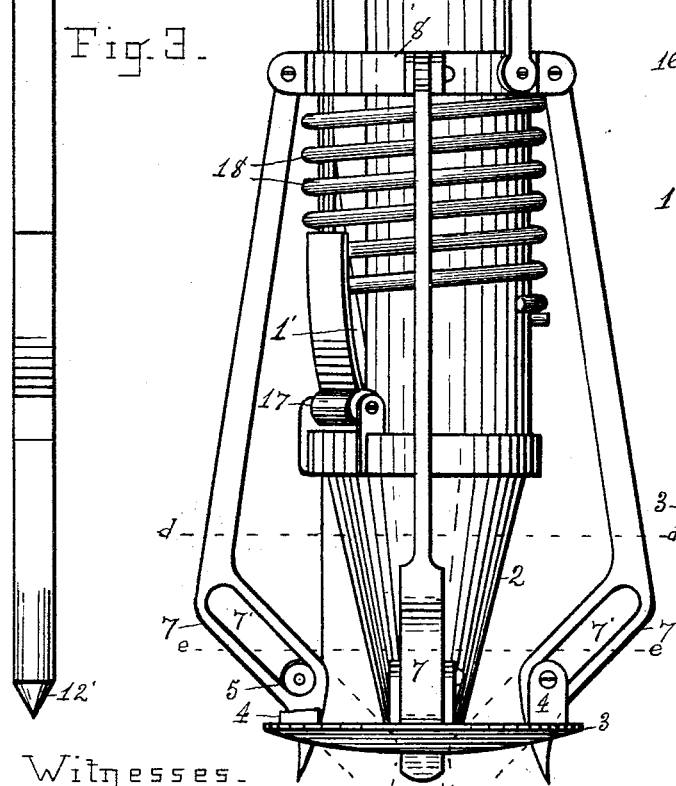
Witnesses.
C. M. Albee
G. A. Nichlos
Inventor.
Wallace L. Field.
By his Att'y. G. H. Albee

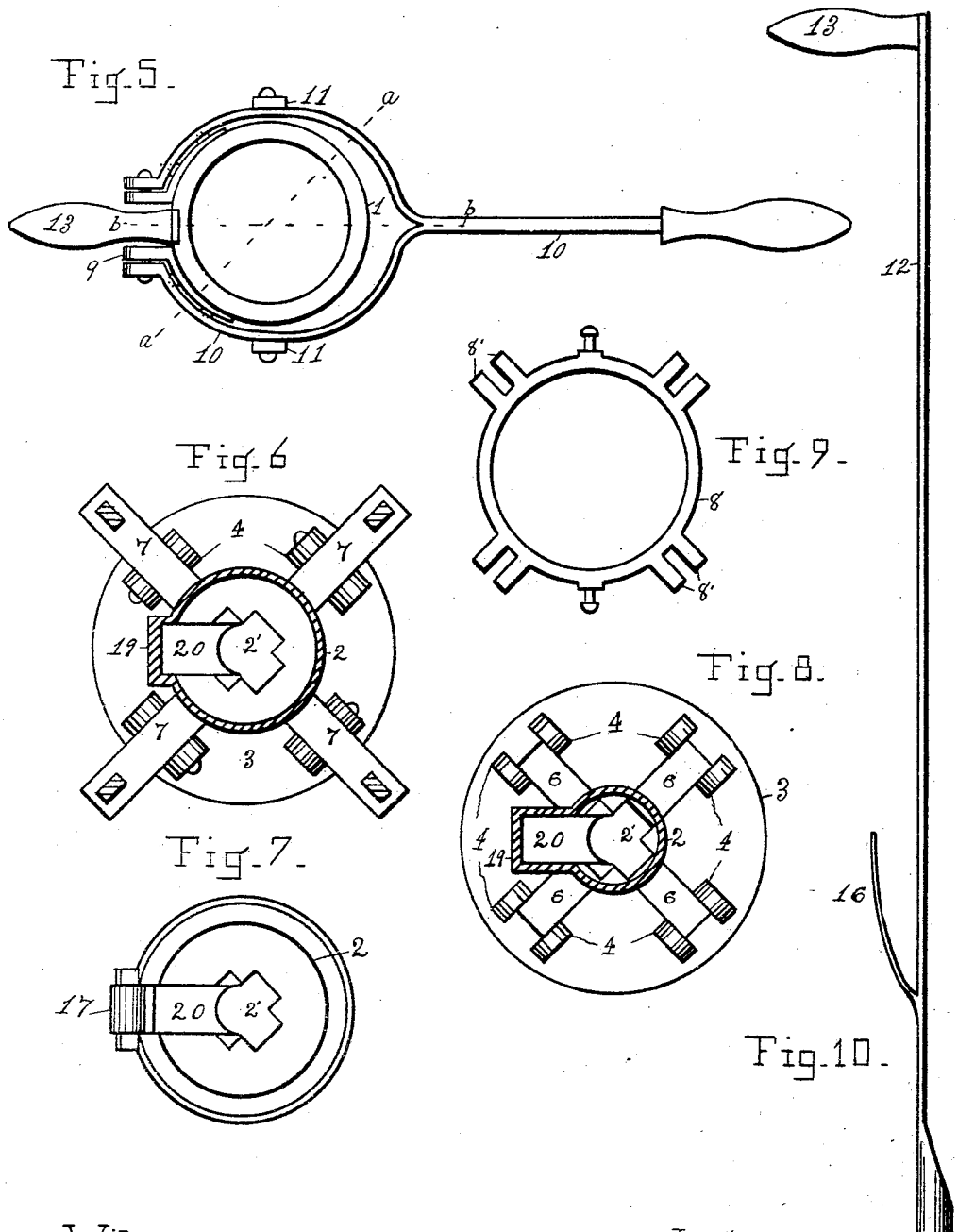

UNITED STATES PATENT OFFICE.

WALLACE L. FIELD, OF WEST DE PERE, WISCONSIN.

TRANSPLANTER.

SPECIFICATION forming part of Letters Patent No. 554,669, dated February 18, 1896.

Application filed August 8, 1895. Serial No. 558,609. (No model.)

*To all whom it may concern:*

Be it known that I, WALLACE L. FIELD, a citizen of the United States, residing at West De Pere, in the county of Brown and State of Wisconsin, have invented a new and useful Improvement in Transplanters, of which the following is a specification.

My invention relates to a device to be carried along by the operator, who is also to carry a supply of plants; and it consists of a plunger-rod having a pointed end or dibble at its lower extremity for forming a hole in the ground for receiving the plant-roots, a tube for receiving and conducting the plant-roots into said hole, and a plurality of fingers for packing the soil around said roots, and thereby leaving the plant in an erect position and properly supported by the soil about it.

The device is particularly adapted for transplanting cabbage-plants or any plants having like characteristics as regards its top and roots; and the object of the improvement is to provide an implement for gardeners' and farmers' use which is easy to operate, is capable of rapid manipulation, and which will leave the plant in a similar condition as when set by the hands and fingers of the gardener. I attain these objects by means of the devices shown in the accompanying drawings, in which—

Figure 1 is a side elevation of the transplanter as it appears in looking at it in the direction of the line $a$ to $a'$ of Fig. 5. Fig. 2 is a longitudinal section of the plant-conducting tube upon the line $b\,b$ of Fig. 5, a part of its upper end being broken away and the soil-packing fingers and their operating devices being omitted. Fig. 3 is a side view of the dibble or plunger rod for forming a hole in the soil for receiving the plant. Fig. 4 is a transverse section of said rod upon the line $c\,c$ of Fig. 3. Fig. 5 is a top view of the transplanter-tube, its packing-finger operating-lever, and the dibble-rod handle. Fig. 6 is a section upon the line $d\,d$ of Fig. 1. Fig. 7 is a top view of the lower section of the transplanter-tube. Fig. 8 is a section upon the line $e\,e$ of Fig. 1 and showing the upper side of the bottom plate of the transplanter. Fig. 9 is a plan of a sliding ring with which the soil-packing fingers are connected. Fig. 10 is an edge view of the dibble-rod.

Similar figures of reference indicate like parts in the several views.

1 indicates the upper tube-section; 2, its lower section; 2', the outlet of the tube; 3, its bottom plate; 4, ears upon the bottom plate; 5, a roller which is arranged to revolve between two of said ears; 6, perforations in said plate through which the soil-packing fingers are operated; 7, packing-fingers; 7', a slot therein; 8, a ring in which the packing-fingers are pivoted by their upward-extending arms; 9, a fulcrum-piece which is bolted to the tube near its upper end; 10, a lever which is fulcrumed thereon and is connected by means of rods 11 to the ring 8 for operating the fingers 7; 12, the plunger or dibble rod; 12', its point; 13, its handle; 14, a slot in the dibble-rod; 15, a bolt and nut secured therein; 16, an arm which projects from the outer side of the dibble-rod; 17, a roller which is journaled upon the tube for engaging said arm and throwing the dibble-rod inward upon its being forced downward; 18, a spring for returning the ring 8 and the packing-fingers to the outward limit of their movement; 19, a pocket in which the dibble-rod normally rests; 20, the inclined bottom of said pocket.

The transplanter consists of a tube about thirty inches long, or of such a length that the workman can walk along with it and operate its parts while in a nearly erect position, and of a suitable diameter for the work in hand, cabbage-plants requiring about three and one-half inches diameter for the upper portion, tapering down to about a one-inch outlet. It will usually be advisable to form the tube in two sections, the upper one of wood or some light material and of a straight bore, and the lower one of metal, its bore decreasing from that of the upper section to a size suitable for the passage of the roots of the plant, while the walls of said section should be of such a form as will best sustain the plant by its top in an upright position until the soil is packed about its roots. The tube is provided for nearly its length with a groove 1', it commencing upon its outside at its upper end and ending upon its inside in the pocket 19. Within the groove the dibble-rod 12 is fitted to slide easily. This device consists of a rod of resilient material, preferably a steel band or ribbon, its upper end having sufficient thickness to be quite stiff, its central part being thinner and quite elastic, and its lower end having a nearly-round portion of a suitable size for forming a hole for the plant-roots, the extreme end of which terminates in a point 12'.

The rod is provided at its upper end with a suitable handle 13. When the rod is in its normal position within the tube the point 12' rests upon the shelf or inclined bottom 20 and leaves the tube unobstructed for the passage through it of the plant. A slight push downward upon the handle will force the pointed end off of the shelf and out of the tube into the soil. A slight pull upward will withdraw the rod, and its resiliency retain it at the upward limit of its movement.

For the purpose of lessening the friction of the dibble-rod in its groove and of its point upon the bottom of the pocket an arm 16 is attached to the rod near its thinner portion and a roller 17 arranged for engaging said arm as a downward movement is given to the rod, and thereby throwing the dibble-point toward the central line of the tube. The arm projecting from the rod and bearing against the roller serves to hold the rod from accidental or a too easy sliding downward.

Near the upper end of the rod a slot 14 is formed, its rear side edges being beveled for receiving the head of a plow-bolt 15. This bolt is provided with a thumb-nut and can be secured at any desired point in said slot by tightening the nut. The nut is arranged to strike the fulcrum-piece 9 and to arrest the downward thrust of the rod. By securing the nut at different points in the slot various depths of holes can be made in the soil for receiving the plant-roots.

It will be evident that a dibble or a stiff-pointed rod of a suitable length and diameter may be used for forming a hole for receiving the plant in connection with the above-described tube instead of the spring-rod arranged to slide in the groove of the tube. The hole may be made and the tube then placed over it and the plant dropped through the tube into the hole, or the transplanter may first be placed in position and the rod pushed through it into the soil and then withdrawn before dropping the plant; but in either case more time and labor would be used than with the rod arranged in the groove as has been described.

For pressing the soil around the plant packing-fingers 7 are provided—four in the present case, although a less number may be used. These fingers have spade-like lower ends and they are provided with a slot 7', in which is fitted a roller 5, which is arranged to revolve upon a pin in the ears 4. The fingers are extended upward and are pivoted to the ears 8' of the ring 8. This ring is connected by rods 11 with the lever 10, the lever being provided with a handle and being fulcrumed upon projecting ears of the fulcrum-piece 9. By giving to the lever-handle a downward movement the packing-fingers will be forced downward, they being guided by the friction-rollers 5 toward the central line of the bore of the tube. A spring 18 is arranged around the tube and under the sliding ring for bearing upward upon the ring and returning the packing-fingers to the upward and outward limit of their movement, when the transplanter can be lifted off and carried to another point.

The lower side of the bottom plate 3 is convex and upon being being dropped upon the desired point will form a dishing indentation in the soil for receiving the plant. This dish in the soil serves for holding a supply of water, which is often required to be supplied to the newly-set plants.

The operation of the device is as follows: The workman being provided with a supply of plants he grasps the handles, one in each hand, and places the bottom plate 3 upon the desired point, where it forms a depression, some of the soil rising through the perforations 6. The dibble-rod is then forced downward and into the soil to the desired depth and forms a hole for receiving the plant, some of the soil around the dibble also rising through said perforations. After withdrawing the dibble a plant is dropped into the tube, its roots falling into said hole while the sides of the lower tube-section hold the plant by its top in an erect position. A downward pressure is then given upon the handle of the lever 10, which movement forces the packing-fingers downward and toward the plant, carrying this soil which has arisen through the perforations, and also what is in the path of the fingers, toward the plant and packing it around and securing the plant in an erect and substantial position. The spring 18 will then return the fingers to the outward limit of their movement, when the transplanter can be lifted off and carried to another point for a repetition of the operation.

Having described my invention, what I claim, and desire to secure by Letters Patent, is—

1. In a transplanter, a tube for receiving a plant and conducting the same to the ground, comprising a cylindrical section of approximately uniform diameter and of a size suited for the passage of the plant through said section, an adjoining section tapering from the first-named section to its outlet in the lower end of said tube, the center of said outlet lying in the central longitudinal line of said tube, a plate surrounding said outlet of a suitable form for forming a seat in the soil for receiving the plant, a plurality of openings in the plate around said outlet adapted for receiving any surplus of soil which may enter the openings in placing the plate in position for use, or that may be forced upward by the dibble in forming the hole for the plant, a plurality of packing-fingers arranged for movement through said openings and in a direction inclining downward and toward the central longitudinal line of said tube, and means for their simultaneous movement toward and from said line, substantially as described.

2. In a transplanter, the combination with a tube for receiving a plant and conducting the same to the ground, consisting of an upper and lower section, the upper one having a straight cylindrical bore, the lower one a bore of decreasing area from said upper section to its outlet in the lower end thereof and the longitudinal central line of said bores being common to both sections, of a groove extending lengthwise of said upper section and ending in a pocket at one side of the bore in said lower section, the pocket having a bottom inclining downward and toward the outlet of said section, a dibble-rod arranged for reciprocation within said groove and having a handle upon its upper end, a dibble upon its lower end adapted to normally lie within said pocket with its point resting upon the bottom thereof, said rod being adapted as its handle is pressed downward, to force the dibble out of said pocket and through the outlet of said lower section and into the soil, a plurality of packing-fingers arranged around said outlet for movement in a direction inclining downward and toward the central longitudinal line of said tube, a lever and suitable connections for moving said fingers toward said line, and means for returning said fingers and holding the same, normally, at the outward limit of their movement, substantially as set forth.

3. In a transplanter, the combination with a tube for receiving a plant and conducting the same to the ground, consisting of an upper and lower section, the upper one having a straight cylindrical bore, the lower one a bore of decreasing area from said upper section to its outlet in the lower end thereof and the longitudinal central line of said bores being common to both sections, of a groove extending lengthwise of said upper section and ending in a pocket at one side of the bore in said lower section, the pocket having a bottom inclining downward and toward the outlet of said section, a dibble-rod arranged for reciprocation within said groove and having a handle upon its upper end, a dibble upon its lower end adapted to normally lie within said pocket with its point resting upon the bottom thereof, said rod being adapted as its handle is pressed downward, to force the dibble out of said pocket and through the outlet of said lower section and into the soil, a plurality of packing-fingers around said outlet arranged for movement in a direction inclining downward and toward the central longitudinal line of said tube, a ring arranged for sliding upon said tube and being connected with said fingers, a lever fulcrumed upon the tube, rods connecting said ring and lever, said ring, lever and rods, being arranged for the simultaneous movement of said fingers toward said central line, and a spring arranged for returning said fingers and holding the same, normally, at the outward limit of their movement, substantially as described.

4. In a transplanter, a tube adapted for receiving a plant and conducting it to the ground, the groove 1', rod 12 having a dibble upon its lower end, a handle for sliding said rod, a gage for limiting the sliding distance thereof, the ring 8, rods 11, packing-fingers 7, bottom plate 3, and a spring for normally holding said fingers at the outward limit of their movement, said parts being combined and operating substantially as described.

5. In a transplanting mechanism, having a tube for receiving a plant and conducting it to the ground, a device for forming a hole in the soil for receiving the plant consisting of a rod of resilient material having upon its lower end a dibble, or pointed block of suitable form and size for forming said hole, said rod being adapted by reason of its form and resiliency for a reciprocating movement within a groove, or passage of the tube, having a slightly angular course lengthwise thereof, and a handle or connecting device by which it may be reciprocated and the dibble forced out of said tube and into the soil, substantially as set forth.

6. In a transplanting mechanism having a tube for receiving a plant and conducting the same to the ground and a groove, or passageway, lengthwise thereof and extending from its upper end to, and ending in a pocket for the dibble near the lower end of said tube, the combination of a rod of resilient material fitted for sliding within said groove and having a dibble upon its lower end adapted to normally lie within said pocket, a roller arranged for revolution upon said tube, an arm projecting from said rod adapted to engage the roller as a downward movement is given to the rod and thereby to throw the dibble toward the central longitudinal line of the tube and out of its lower end, substantially as set forth.

7. In a transplanter having a tube for receiving a plant and conducting the same to the ground, the combination of a packing-finger arranged near the lower end of said tube and being suitably shaped at its lower end for packing the soil around the plant, and intermediate its ends having a portion inclining downward and toward the central longitudinal line of said tube and at an angle with its end portions, a slot arranged transversely of said intermediate portion and extending lengthwise thereof, a roller journaled for revolution near the lower end of said tube and revoluble within said slot, said slot and roller serving to guide the finger in a direction inclining downward and toward the plant when a downward pressure is given said finger, substantially as described.

WALLACE L. FIELD.

Witnesses:
CHARLES A. LAWTON,
H. BURLAMENT.